(12) United States Patent  
Glenn et al.

(10) Patent No.: US 9,150,138 B2
(45) Date of Patent: Oct. 6, 2015

(54) SYSTEM AND METHOD FOR FACILITATING WELL CONSTRUCTION

(75) Inventors: Scott Glenn, Hurricane, WV (US); Lars R. Halvorsen, Charleston, WV (US); Kirby Jon Walker, Sewickley, PA (US); John Reinhart, Charleston, WV (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/370,897

(22) Filed: Feb. 10, 2012

(65) Prior Publication Data

US 2012/0141239 A1 Jun. 7, 2012

Related U.S. Application Data

(62) Division of application No. 11/132,568, filed on May 19, 2005, now Pat. No. 8,137,051.

(51) Int. Cl.
*B65G 67/00* (2006.01)
*B60P 3/16* (2006.01)
*B60P 3/00* (2006.01)

(52) U.S. Cl.
CPC .... *B60P 3/16* (2013.01); *B60P 3/00* (2013.01)

(58) Field of Classification Search
CPC ........................................................ B60P 3/00
USPC ............... 414/498, 572, 341, 809; 166/75.11, 166/177.4, 243, 285, 379
See application file for complete search history.

(56) References Cited

U.S. PATENT DOCUMENTS

| | | |
|---|---|---|
| 2,857,062 A | 10/1958 | Anderson |
| 3,239,080 A | 3/1966 | Corompt |
| 3,291,329 A | 12/1966 | Ord |
| 3,770,060 A | 11/1973 | Forsyth et al. |
| 3,784,035 A | 1/1974 | Dunbar |
| 3,874,526 A | 4/1975 | Lambert |
| 3,944,190 A | 3/1976 | Dunmire |
| 4,078,818 A | 3/1978 | Donnelly |
| 4,097,925 A | 6/1978 | Butler, Jr. |
| 4,268,201 A | 5/1981 | Cayton |
| 4,509,894 A | 4/1985 | Rolfe |
| 4,913,554 A | 4/1990 | Bragg et al. |
| 4,930,972 A | 6/1990 | Little |
| 5,103,908 A | 4/1992 | Allen |
| 5,467,827 A | 11/1995 | McLoughlin |
| 6,547,506 B1 | 4/2003 | Jacob |
| 6,766,854 B2 | 7/2004 | Ciglenec et al. |
| 2002/0156730 A1 | 10/2002 | Newman |
| 2002/0195247 A1 | 12/2002 | Ciglenec et al. |
| 2007/0014653 A1 | 1/2007 | Glenn et al. |
| 2007/0056730 A1 | 3/2007 | Keese et al. |

*Primary Examiner* — Scott Lowe
(74) *Attorney, Agent, or Firm* — Michael L. Flynn; Rachel Greene; Tim Curington

(57) ABSTRACT

A technique is provided to limit the number of vehicles required during a well project involving a plurality of well construction related procedures. The technique utilizes a modular unit, e.g. a vehicle, and a plurality of modules that may be interchanged on the modular unit according to the scheduled well procedure. A separate crane unit can be used to move the modules to and from the vehicle as required for specific phases of well construction.

19 Claims, 4 Drawing Sheets

SYSTEM AND METHOD FOR FACILITATING WELL CONSTRUCTION

CROSS-REFERENCE TO RELATED APPLICATION

This application claims priority as a divisional application of U.S. patent application Ser. No. 11/132,568, filed May 19, 2005, now U.S. Pat. No. 8,137,051, entitled SYSTEM AND METHOD FOR FACILITATING WELL CONSTRUCTION, which is hereby incorporated by reference in its entirety.

BACKGROUND

In well construction projects, numerous well related vehicles and equipment are required for various well construction procedures. For example, cementing applications, such as placing a casing or a liner in a wellbore, involve cementing the casing or liner to the inner wall of the wellbore. Cement is mixed at a surface location and pumped into the wellbore as cement slurry. The cement slurry is flowed into an annular region between the outside of the casing or liner and the inner wall of the wellbore. The slurry is mixed at the well surface via cement mixing equipment carried on a truck or trucks, which are used to move the cement mixing and pumping equipment to multiple well sites requiring such services.

Other well construction procedures, such as openhole logging and acid treatment procedures, are performed with separate equipment carried by separate vehicles. For example, a wireline truck is used to carry the wireline equipment, and an acid pumping truck is used to carry equipment for the acid treatment procedure. Each of these trucks and equipment requires a separate crew to carry out the specific well construction related procedure. By way of example, a well construction project involving a cementing procedure, acid treatment procedure and wireline procedure can require five separate equipment carrying trucks plus supporting pickup trucks. The many separate trucks and separate crews can create inefficiencies in scheduling, dispatching, road travel, project cost and other factors affecting well construction projects.

SUMMARY

In general, the present invention provides a system and method of facilitating well construction and reducing inefficiencies in performance of well construction related services. The system and method utilize a vehicle having a cement pumping unit for cementing procedures and a mounting unit for selectively receiving modules related to other well construction procedures. A plurality of modules, specifically designed for unique phases of the well construction project, can be sequentially mounted to the mounting unit enabling the use of a single vehicle in the performance of a plurality of well related procedures.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to well construction projects in which various well procedures, e.g. services, are performed. The efficiency of well construction is enhanced by providing the capability of performing multiple well construction related procedures with a reduced number of equipment carrying vehicles. The system also enables a reduction in the number of crew members while providing easy transportability of equipment from one well site to another.

Efficiency of well construction is enhanced, at least in part, by a modular unit that can handle specific aspects of a well construction process before being reconfigured for subsequent well construction related procedures. The single modular unit may be designed, for example, to handle cementing processes, such as the cementing of casings or liners in a wellbore while being readily reconfigurable for subsequent well construction procedures, such as acid injection applications and logging/wireline processes.

Figure 1:
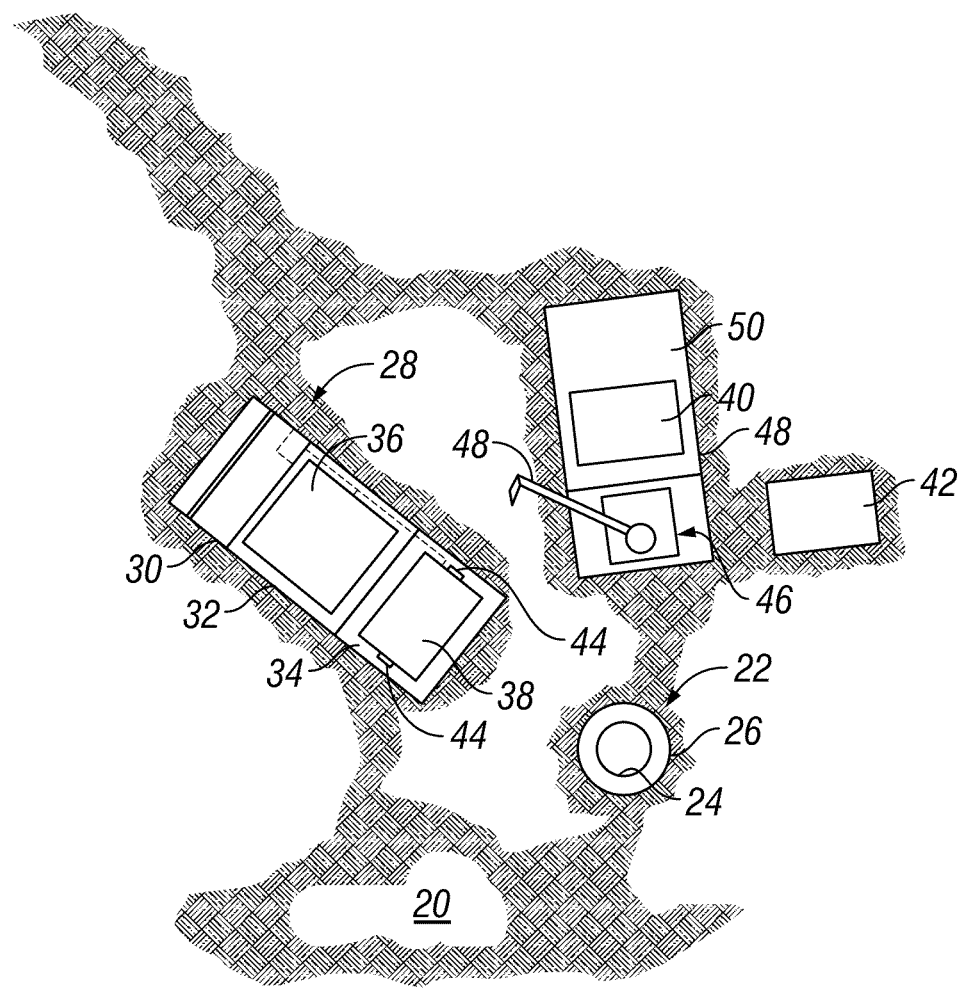
FIG. 1 is a schematic top view of a well site with components to facilitate well construction, according to an embodiment of the present invention.

Referring generally to FIG. 1, a top view of a well site 20 is illustrated. In this example, a well 22 is undergoing well construction procedures and generally comprises wellbore 24 extending downwardly from a wellhead 26 into a subterranean formation containing desired production fluids, such as hydrocarbon based fluids. In many projects, wellbore 24 is drilled into an oil bearing formation for the production of oil. Additionally, only one well 22 is illustrated, but a given project may comprise multiple wells that undergo various well construction related procedures. It also should be noted that certain well construction procedures can be performed on new or existing wells.

As illustrated in FIG. 1, a modular unit 28 is provided at well site 20 for the performance of a plurality of well construction related procedures. Modular unit 28 comprises a vehicle 30 that may be moved around well site 20 or from one well site to another. In this embodiment, vehicle 30 is a road legal truck that may be driven from one well site to another or from one well project to another over the public road system of the region.

In the example illustrated, vehicle 30 comprises a well construction equipment region 32 and a mounting unit 34. Well construction equipment region 32 may be designed to receive a fixed cement pumping unit 36, and mounting unit 34 is designed to interchangeably receive a plurality of modules, e.g. modules 38, 40 and 42. The modules are selectively mounted to mounting unit 34 via a mounting mechanism 44 that enables the easy connection and disconnection of each module for facilitating a specific unique phase of well construction. The series of modules may be mounted to mounting unit 34, sequentially, to facilitate the sequential phases of well construction. A given module typically is designed for a specific phase of the well project, e.g. cementing, acid application, logging. Mounting mechanism 44 can comprise a variety of designs, including mechanical catch and release mechanisms, fasteners, e.g. bolts, hydraulically actuated locks or other mechanisms that enable the relatively rapid mounting of the module, disconnection of the module, and mounting of a subsequent module according to the well construction procedures for a given project.

Modules 38, 40 and 42 may be sequentially mounted and disconnected from mounting unit 34 with the aid of a crane unit 46. Crane unit 46 comprises a boom 48 used to move a given module to or from mounting unit 34. For example, crane unit 46 can be connected to module 38 upon completion of a well construction related procedure. Module 38 is then lifted to a storage location, and module 40 is moved to mounting unit 34 and secured. Upon completion of the second well related procedure, crane unit 46 can be used to move module 40 to storage, and module 42 is moved into position on mounting unit 34. Accordingly, a variety of well construction related procedures can be carried out sequentially with a combined use of vehicle 30 and crane unit 46. In some applications, alternate or additional modules can be used for other well related procedures.

Crane unit 46 may comprise a stand alone crane positioned at well site 20. Alternatively, however, crane unit 46 may comprise a vehicle 48, such as a road legal vehicle. In this latter example, vehicle 48 may comprise a load carrying region 50 sized to carry one or more of the modules 38, 40 or 42. In a specific example, load carrying region 50 is sized to carry two modules, thus enabling the transport of three modules (one on vehicle 30 and two on vehicle 48) to each well site.

Figure 2:
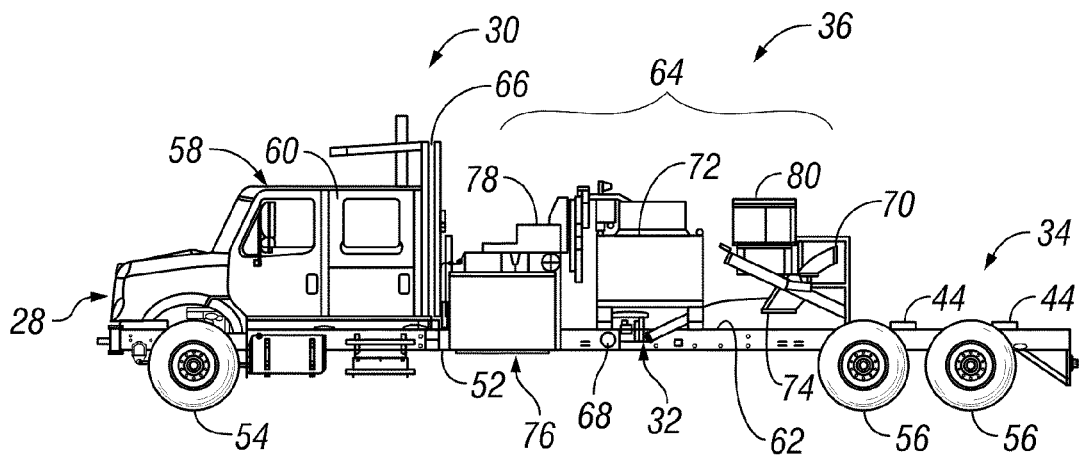
FIG. 2 is a side view of a vehicle having a mounting unit for receiving interchangeable modules, according to an embodiment of the present invention.

An embodiment of vehicle 30 is illustrated in FIG. 2. In this embodiment, vehicle 30 is a road legal truck having a chassis 52 supported on front wheels 54 and rear wheels 56. As illustrated, rear wheels 56 are mounted on a pair of axles. However, vehicle 30 may comprise a single rear axle or multiple rear axles depending on the weight of the equipment carried as well as the regional regulations pertaining to use of vehicles on public roadways.

A cab 58 is mounted on chassis 52 and may comprise an extended or double cab region 60 to provide room for carrying, for example, control system equipment, as discussed below. Cement pumping unit 36 also is mounted on chassis 52 to the rear of cab 58. In this example, the cement pumping unit 36 is mounted to the chassis by a platform 62 that provides an equipment supporting surface. Chassis 52 extends rearwardly of cement pumping unit 36 to provide space for mounting unit 34.

Various equipment configurations may be mounted at well construction equipment region 32 depending on the specific well procedures for which the vehicle is designed. In the example illustrated, however, cement pumping unit 36 comprises cement mixing and pumping equipment 64 and a reel and hose assembly 66. An example of the equipment that may be mounted at the well construction equipment region 32 of vehicle 30 is the cement mixing and pumping equipment found on the CemSTREAK® pumper truck available from Schlumberger. In this example, the CemSTREAK® cement mixing and pumping equipment 64 has several inlets for receiving materials, such as inlets 68 for receiving water and inlets 70 for receiving particulate material, e.g. cement in powder form. The equipment further includes a reservoir 72, such as a pair of reservoirs, coupled to a cement mixer 74. A pair of reservoirs may be used as displacement tanks and, in some embodiments, at least one of the reservoirs can be used as a mixing tank to mix cement, water and additive to form the cement slurry. The cement slurry is pumped into wellbore 24 by a pumping 76 that moves the slurry through the hose of reel and hose assembly 66. Pump 76 is positioned generally between the reservoir/displacement tank 72 and cab 58. Other components may comprise a flowmeter 78 for monitoring the flow of cement slurry and a control console 80 that may be used by an operator to control the mixing and pumping of cement slurry.

Figure 3:
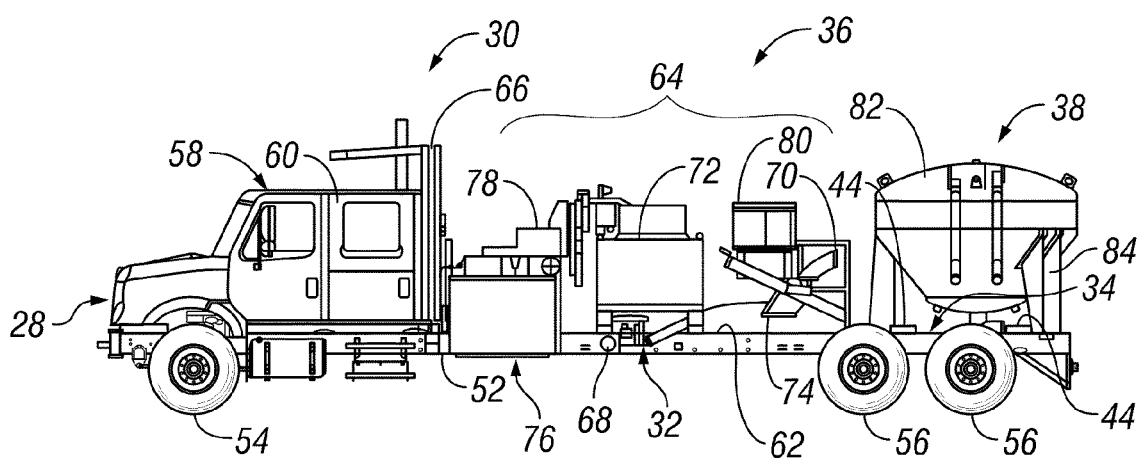
FIG. 3 is a side view of the vehicle illustrated in FIG. 2 with a cement bulk module attached, according to an embodiment of the present invention.

In the embodiment illustrated in FIG. 2, cement pumping unit 36 provides mixing and pumping capabilities for well construction cementing procedures. However, other well construction processes are handled by modules selectively mounted to mounting unit 34, as opposed to using separate vehicles to perform these additional well related functions. As illustrated in FIG. 3, for example, module 38 may comprise a module for supplying bulk material to cement mixing and pumping equipment 64. Cement bulk module 38 comprises a bulk material holding tank 82 mounted on a support framework 84 that may be readily connected and disconnected from mounting unit 34 via mounting mechanism 44. Instead of supplying bulk material via a separate truck, module 38 is simply mounted to mounting unit 34 during the cement mixing and pumping phases of well construction. Upon completion of the cementing process, module 38 may be disconnected and removed from mounting unit 34 to enable the interchanging of module 38 with another module.

Figure 4:
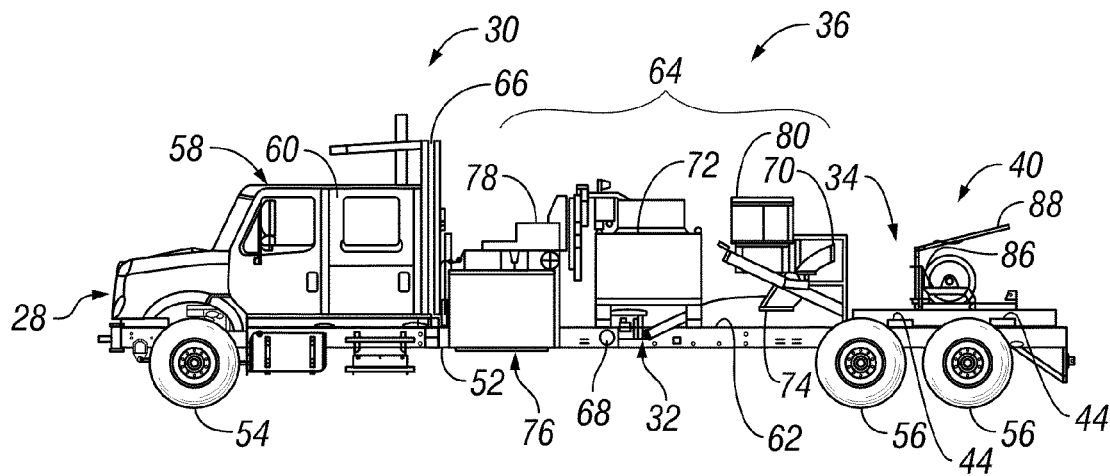
FIG. 4 is a side view of the vehicle illustrated in FIG. 2 with a wireline module attached, according to an embodiment of the present invention.

As illustrated in FIG. 4, another module, such as module 40, is readily interchanged with module 38. In this example, module 40 comprises a wireline module having, for example, a wireline 86 and a wireline winch 88 for moving the wireline into wellbore 24. Wireline module 48 can be used for a variety of well construction related procedures, including the logging of data from within the well. Upon completion of this phase of well construction, module 40 is released from mounting unit 34 to enable the interchanging of another module, such as module 42.

Figure 5:
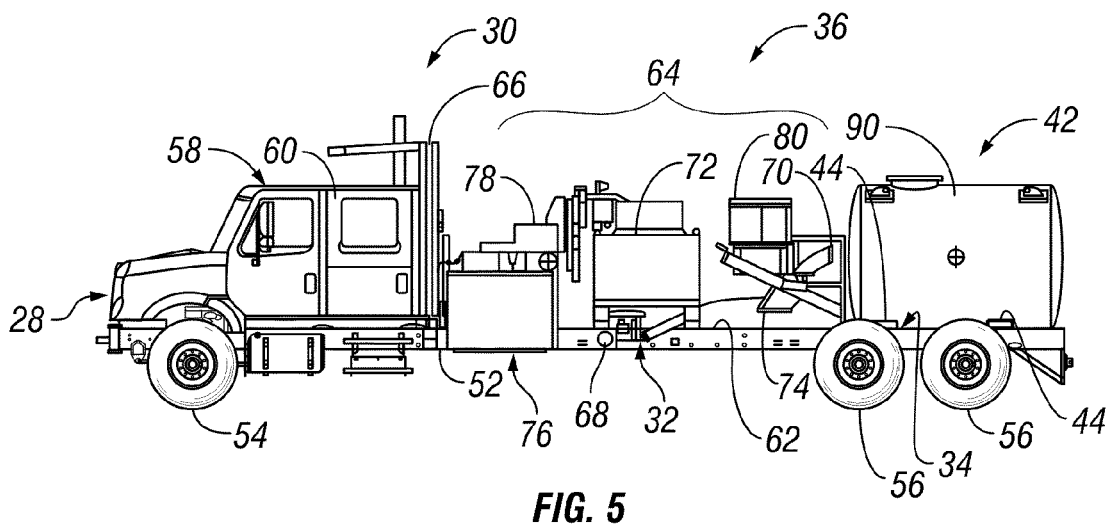
FIG. 5 is a side view of the vehicle illustrated in FIG. 2 with an acid bulk module attached, according to an embodiment of the present invention.

Referring generally to FIG. 5, vehicle 30 is illustrated with module 42 interchanged for module 40. In this example, module 42 comprises an acid bulk module having an acid tank 90 for holding acid that is used in acid treatment procedures within well 22. Again, upon completion of the acid treatment procedure, module 42 can be disconnected to enable interchanging with another module. If the well project is completed, the module can be left mounted at mounting unit 34 for transport to another location. It should be noted that the modules and the process order discussed above are used simply to demonstrate the modular interchangeability that promotes desired efficiencies in well construction. The actual number of modules, functionality of the modules, and the sequence of interchanging modules can vary depending on the specific well project for which vehicle 30 is utilized.

Figure 6:
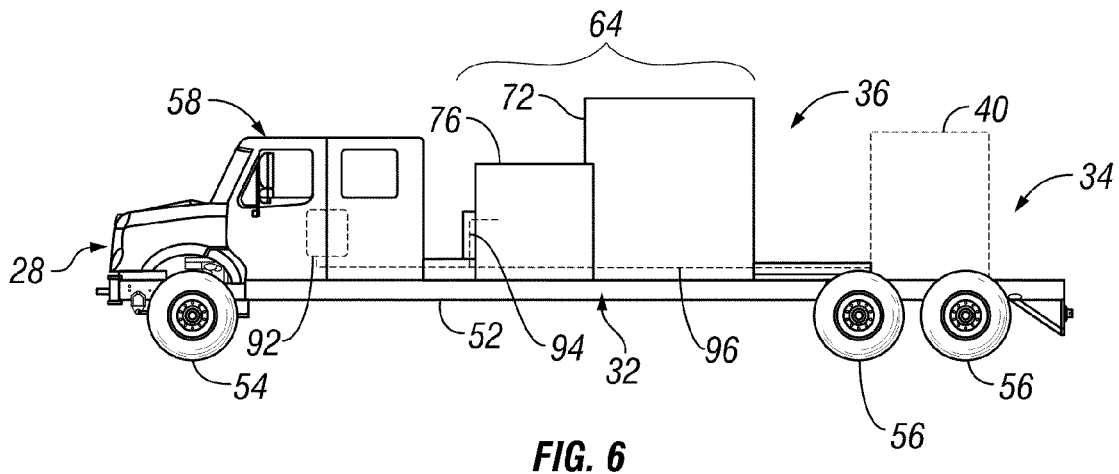
FIG. 6 is a schematic illustration of the vehicle illustrated in FIG. 2 with a control system, according to an embodiment of the present invention.

In the embodiment illustrated in FIG. 6, a control system 92 is located within cab 58. Control system 92 is operatively coupled to cement mixing and pumping equipment 64 via a communication line 94 that enables control of the cementing process from within cab 58. Control system 92 also may be operatively coupled to selected modules, such as module 40, via a communication line 96. In this example, control system 92 is coupled to wireline module 40 to enable control of the wireline process from within cab 58. Accordingly, control over cementing procedures and other procedures enabled by specific modules, e.g. wireline procedures, all may be controlled by an operator from within the cab of the vehicle. Communication of data via communication lines 94 and 96 may be accomplished by a variety of communication techniques, hardware and protocols. For example, communication lines 94 and 96 may be hardwired communication lines, wireless communication lines or fluid communication lines.

Figure 7:
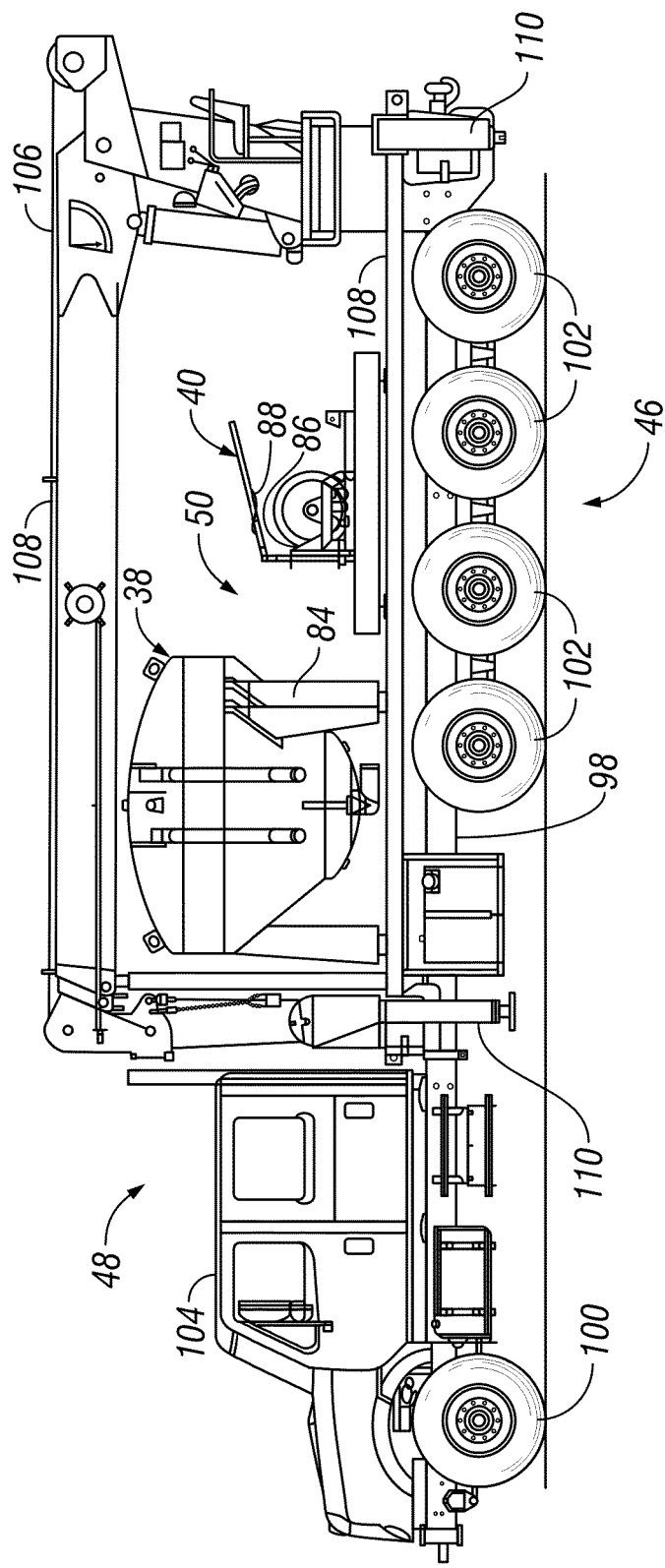
FIG. 7 is a crane vehicle that may be used with the system illustrated in FIG. 1.

Referring generally to FIG. 7, one embodiment of crane unit 46 is illustrated. In this embodiment, the crane unit is formed as vehicle 48. Vehicle 48 may be a road legal truck having a chassis 98 supported on front wheels 100 and rear wheels 102. As illustrated, rear wheels 102 are mounted on four axles. However, vehicle 48 may comprise other numbers of rear axles depending on the weight of the equipment carried as well as the regional regulations pertaining to use of vehicles on public roadways.

A cab 104 is mounted on chassis 98, and a crane 106 also is mounted on chassis 98 via a platform 108. In this embodiment, crane 106 is mounted towards the rear of vehicle 48 and comprises a boom 108 used to lift and move modules to and from mounting unit 34 of vehicle 30. A plurality of stabilizer mechanisms 110, such as hydraulic stabilizer arms, can be pressed against the ground to stabilize platform 108 during movement of modules with crane 106. Additionally, this embodiment of vehicle 48 also facilitates the storage of at least one module at load carrying region 50. In the specific embodiment illustrated, load carrying region 50 is located on platform 108 between the base of crane 106 and cab 104 and is sized to carry two modules, such as module 38 and module 40. With this overall system design, three separate modules can be moved from one well site to another with one module mounted on mounting unit 34 of vehicle 30 and two modules mounted on load carrying region 50 of vehicle 48.

In operation, a cement mixing and pumping unit may be mounted on a road legal vehicle along with a module mounting unit for receiving modules related to specific well construction procedures. At each well site, the modules are readily interchanged with the aid of crane unit 46 which is designed to remove a given module from mounting unit 34, move that module to a separate location, attach and lift a different module from load carrying region 50 or other location, and move the new module into engagement with mounting unit 34 of vehicle 30. This process can be repeated for each well related procedure until the well project is completed. If crane unit 46 comprises vehicle 48, the modules then can simply be loaded on vehicles 30 and 48 and moved to the next well site. Thus, the system and method described above enables one or two vehicles located at a well site to perform multiple procedures by interchanging modules, e.g. modules 38, 40 and 42, on modular unit 28. The specific modules and the sequence of interchanging is selected according to the specific procedures desired for a given well project.

It should be noted that modular unit 28 may be constructed in a variety of configurations of fixed and reconfigurable functionality. For example, other permanent equipment for different types of procedures can be used instead of cement mixing and pumping equipment 64. Additionally, the size and functionality of the modules described above can be changed or adjusted.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method for performing at least one well oilfield operation with a reduced number of vehicles at a well site during a well construction, comprising:
    selecting at least one well process module to perform a first phase of the wellbore operation;
    mounting the selected well process module on a vehicle;
    coupling a control system on the vehicle to the selected well process module and configuring the control system to control a procedure of the first phase of the wellbore operation;
    performing the first phase of the wellbore operation;
    selecting at least one subsequent well process module to perform a second phase of the wellbore operation;
    de-coupling the control system from the selected well process module;
    interchanging, on the vehicle, at least one well process module for the first phase of the wellbore operation with the subsequent well process module for the second phase of the wellbore operation;
    mounting the subsequent well process module on the vehicle;
    coupling the control system to the subsequent well process module of the second phase of the wellbore operation and configuring the control system to control a procedure of the second phase of the wellbore operation; and
    performing the second phase of the wellbore operation.

2. The method as recited in claim 1, wherein mounting comprises utilizing a crane mounted on a crane truck to move the well process module from the crane truck to the vehicle.

3. The method as recited in claim 2, further comprising storing at least two well process modules on the crane truck for use on the vehicle during other phases of well construction.

4. The method as recited in claim 1, wherein interchanging comprises utilizing a crane mounted on a crane truck to move the well process module from the vehicle to the crane truck.

5. The method as recited in claim 1, wherein coupling comprises coupling the control system to the well process module via a communication line.

6. The method as recited in claim 1, wherein first phase comprises a cement mixing and pumping operation.

7. The method as recited in claim 1, wherein second phase comprises an acid treatment procedure.

8. The method as recited in claim 1, wherein second phase comprises a wireline logging procedure.

9. The method as recited in claim 1, wherein further comprising a third phase of the wellbore operation and wherein selecting, de-coupling, and interchanging, mounting, coupling, and performing are each performed for a third well process module and third phase of the wellbore operation.

10. The method as recited in claim 1, wherein the vehicle comprises a fixed cement pumping unit and mounting comprises mounting the well process module to a mounting unit positioned on the vehicle to the rear of the cement pumping unit.

11. The method as recited in claim 1, wherein the well process modules comprise at least one of a cement bulk module, an acid bulk module, and a wireline module.

12. A system for facilitating well construction, comprising:
    a vehicle having a cement mixing and pumping unit for cementing operations and a mounting unit;
    a plurality of modules, each module being designed for a unique phase of well construction, wherein the plurality of modules are sequentially mountable to the mounting unit of the vehicle to perform the unique phase of well construction corresponding to a given module;

a crane truck comprising a plurality of mounting regions, each of the mounting regions configured to receive one of the plurality of the modules; and a control system located in the vehicle, the control system configured to be selectively coupled to each of the plurality of modules to control a procedure of the unique phase of well construction corresponding to each of the modules.

13. The system as recited in claim 12, wherein the plurality of modules comprises a cement bulk module.

14. The system as recited in claim 12, wherein the plurality of modules comprises a wireline module.

15. The system as recited in claim 12, wherein the plurality of modules comprises an acid bulk module.

16. The system as recited in claim 12, wherein the vehicle and the crane truck each comprise a road legal truck.

17. The system of claim 16, wherein each road legal truck comprises a vehicle cab.

18. The system as recited in claim 12, wherein the mounting unit is located to the rear of the cement mixing and pumping unit.

19. The system of claim 12, wherein the control system is coupled to the modules via a communication line.

* * * * *